(12) United States Patent
Chokappa et al.

(10) Patent No.: US 12,056,669 B2
(45) Date of Patent: Aug. 6, 2024

(54) MAINTENANCE SYSTEM AND METHOD

(71) Applicant: Eaton Intelligent Power Limited, Dublin (IE)

(72) Inventors: Karthikeyan S. Chokappa, Pune (IN); Samuel B. Lazarus, Pune (IN); Steve D. Townes, Jr., Arlington, VA (US); Sukhbir Kashyap, Haryana (IN); Galen L. Chui, Ladera Ranch, CA (US); Aniruddh S. Deshpande, Pune (IN); Anil B. Ghegade, Pune (IN); Mijaz Mukundan, Kerala (IN); Andrew M. Laskovy, Hundsonville, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 319 days.

(21) Appl. No.: 17/434,532

(22) PCT Filed: Feb. 26, 2020

(86) PCT No.: PCT/US2020/019805
§ 371 (c)(1),
(2) Date: Aug. 27, 2021

(87) PCT Pub. No.: WO2020/176567
PCT Pub. Date: Sep. 3, 2020

(65) Prior Publication Data
US 2022/0138701 A1 May 5, 2022

(30) Foreign Application Priority Data
Feb. 28, 2019 (IN) .............................. 201911007916

(51) Int. Cl.
*G06V 10/00* (2022.01)
*G06Q 10/20* (2023.01)
*G06T 7/00* (2017.01)

(52) U.S. Cl.
CPC ............ *G06Q 10/20* (2013.01); *G06T 7/0006* (2013.01)

(58) Field of Classification Search
CPC ............ G06N 3/08; G06N 3/02; G06N 3/045; G06N 3/092; G06N 3/0475; G01N 21/88;
(Continued)

(56) References Cited

U.S. PATENT DOCUMENTS 9,031,734 B2  5/2015 Froom
9,587,461 B1* 3/2017 Jaffrey .................... E21B 33/06
(Continued)

FOREIGN PATENT DOCUMENTS

CN  103380057 B  10/2016
CN  106370670 A  2/2017

OTHER PUBLICATIONS

Wang et al., "CN108717262A Irregular curved surface tracking method and system based on matrix feature learning neural network", Oct. 30, 2018.*
(Continued)

*Primary Examiner* — Amir Alavi
(74) *Attorney, Agent, or Firm* — Merchant & Gould P.C.

(57) ABSTRACT

A maintenance method for servicing a component includes generating, via an electronic control unit, a digital model of the component, detecting, via the electronic control unit, a defect of the component, classifying, via the electronic control unit, the defect as a defect type, and evaluating the defect to determine, according to the defect type, whether to repair the defect or to replace a section of the component containing the defect. A maintenance system for servicing
(Continued)

components may include a scanner and an ECU configured to create a digital model of a component, detect a defect of the component from the digital model and/or three-dimensional data of the component, classify the defect as a defect type of a plurality of defect types, and/or evaluate the defect according to the defect type.

21 Claims, 8 Drawing Sheets

(58) Field of Classification Search
CPC .. G01N 21/9501; G06T 7/0006; G06Q 10/06; G06Q 10/20; G06Q 10/10
See application file for complete search history.

(56) References Cited

U.S. PATENT DOCUMENTS

| | | | | |
|---|---|---|---|---|
| 11,680,909 | B2 * | 6/2023 | Safai | B22F 10/38 |
| | | | | 264/409 |
| 11,734,466 | B2 * | 8/2023 | Hoogendoorn | G06F 30/17 |
| | | | | 703/1 |
| 2016/0318632 | A1 * | 11/2016 | Froom | G01N 23/00 |
| 2017/0095978 | A1 * | 4/2017 | Juhasz | B29C 64/40 |
| 2017/0132922 | A1 * | 5/2017 | Gupta | G08G 1/0962 |
| 2018/0086453 | A1 * | 3/2018 | Scott-Nash | G08G 5/0021 |
| 2018/0300873 | A1 | 10/2018 | Rojas et al. | |
| 2019/0007269 | A1 * | 1/2019 | Ackley | H04L 63/104 |
| 2019/0035180 | A1 * | 1/2019 | Le | G07C 5/0858 |
| 2020/0207472 | A1 * | 7/2020 | Scott-Nash | G08G 5/0021 |
| 2022/0138701 | A1 * | 5/2022 | Chokappa | G06Q 10/06 |
| | | | | 705/305 |

OTHER PUBLICATIONS

International Search Report, PCT/US2020/019805, dated Apr. 22, 2020.

Wrtiten Opinion of the International Searching Authority, PCT/US2020/019805, dated Aug. 25, 2021.

* cited by examiner

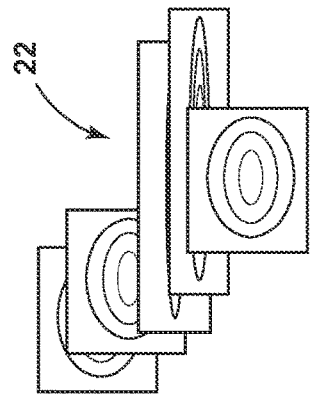
FIG. 3E
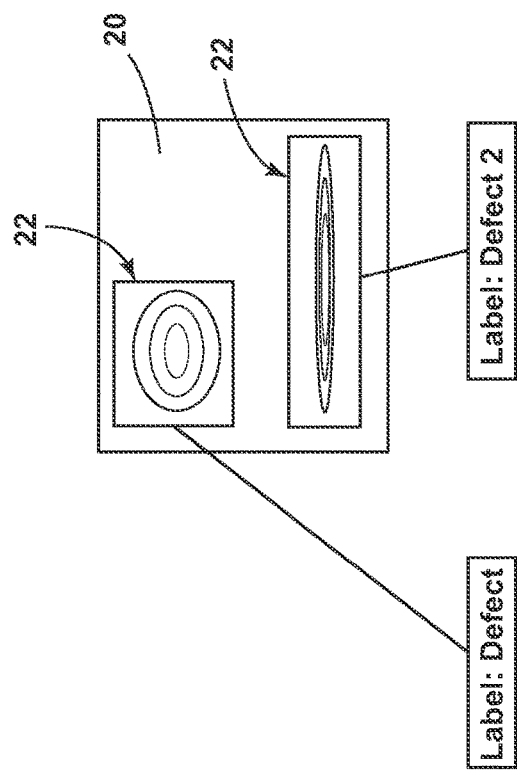
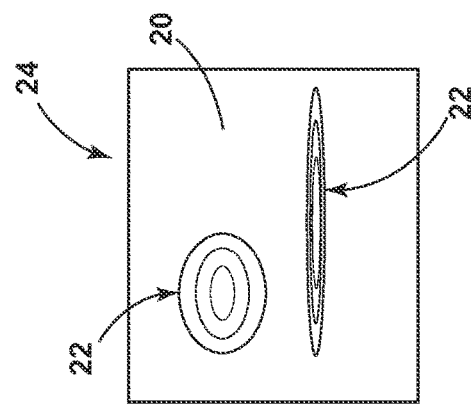
FIG. 3F
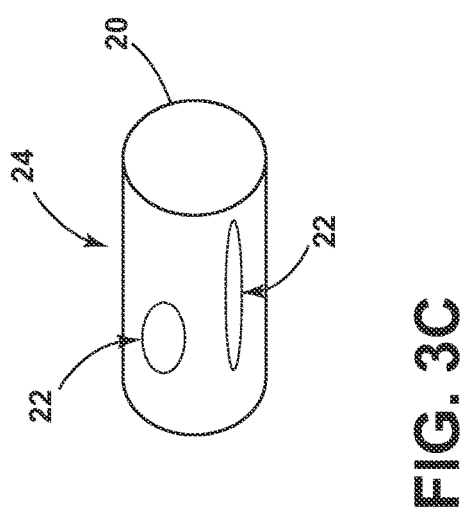
FIG. 3C
FIG. 3D

MAINTENANCE SYSTEM AND METHOD

CROSS-REFERENCE TO RELATED APPLICATION

This application is a National Stage patent application of International Patent Application No. PCT/US2020/019805, filed Feb. 26, 2020, which claims the benefit of India Provisional Patent Application Serial No. 201911007916, filed on Feb. 28, 2019, the disclosure of which is hereby incorporated by reference in its entirety as though fully set forth herein.

TECHNICAL FIELD

The present disclosure generally relates to maintenance systems and methods, including maintenance systems and methods that may, for example, be used in connection with aircraft components.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some maintenance methods and systems are not efficient and/or involve extended turnaround times (TAT).

There is a desire for solutions/options that minimize or eliminate one or more challenges or shortcomings of maintenance methods and systems. The foregoing discussion is intended only to illustrate examples of the present field and is not a disavowal of scope.

SUMMARY

In embodiments, a maintenance method for servicing a component may include generating, via an electronic control unit, a digital model of the component, detecting, via the electronic control unit, a defect of the component, classifying, via the electronic control unit, the defect as a defect type, and/or evaluating the defect to determine, according to the defect type, whether to repair the defect or to replace a section of the component containing the defect.

With embodiments, a maintenance system for servicing components may include a scanner configured to obtain three-dimensional data of a component, and/or an ECU configured to create a digital model of a component, detect a defect of the component from the digital model and/or three-dimensional data of the component, classify the defect as a defect type of a plurality of defect types, and/or evaluate the defect according to the defect type.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

FIGS. 3A-3F are representations of components generally illustrated via an embodiment of a display of a maintenance system according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
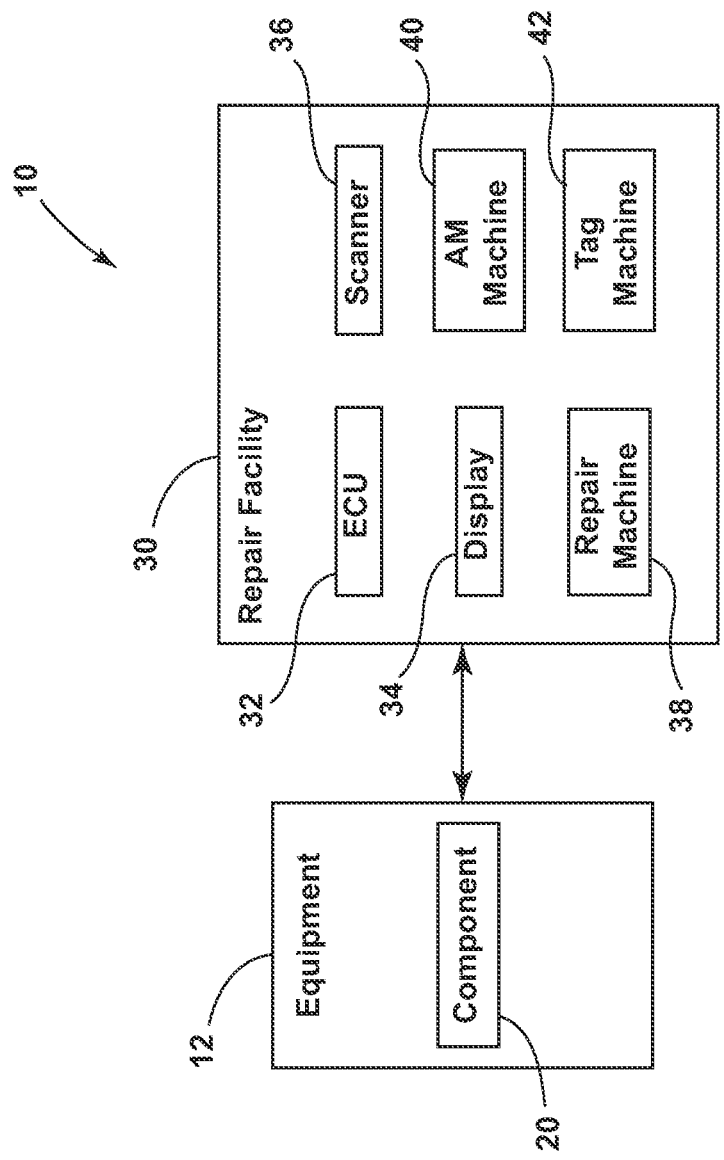
FIG. 1 is schematic view generally illustrating an embodiment of a maintenance system according to teachings of the present disclosure.

With embodiments, such as generally illustrated in FIG. 1, a maintenance system 10 may include equipment 12 having one or more components 20, and/or a repair facility 30. Equipment 12 may include, for example and without limitation, a machine and/or a vehicle, among others (e.g., an aircraft, automobile, aircraft engine, etc.). A component 20 may, for example and without limitation, include aircraft engine ducts/tubes and/or bleed air ducts, but the system 10 may be used in connection with other components and/or non-aircraft components. Aircraft ducts may be disposed in one or more locations in an aircraft, such as around the periphery of aircraft engines. Components 20, such as aircraft ducts, may be relatively complex in shape and/or may be designed to withstand high pressures (about 2000 psi) and/or high temperatures (about 1600 Fahrenheit/870 Celsius). Components 20 may be rigid and/or metal. With some components 20, it may be economical to maintain, repair, and/or overhaul such a component 20 instead of replacing them, such as because of one or more relatively extreme design features.

In embodiments, a repair facility 30 may, for example and without limitation, include an electronic control unit (ECU) 32, a display 34 (e.g., an electronic display), a scanner 36, a repair machine 38, an additive manufacturing (AM) machine 40, and/or a tag machine 42. The repair facility 30 may include a fixed facility (e.g., a permanent building), a mobile facility (e.g., a vehicle), and/or a location at which one or more possible parts of a facility 30 are located (e.g., parts of a facility 30 may be assembled and disassembled in various locations).

Figure 2:
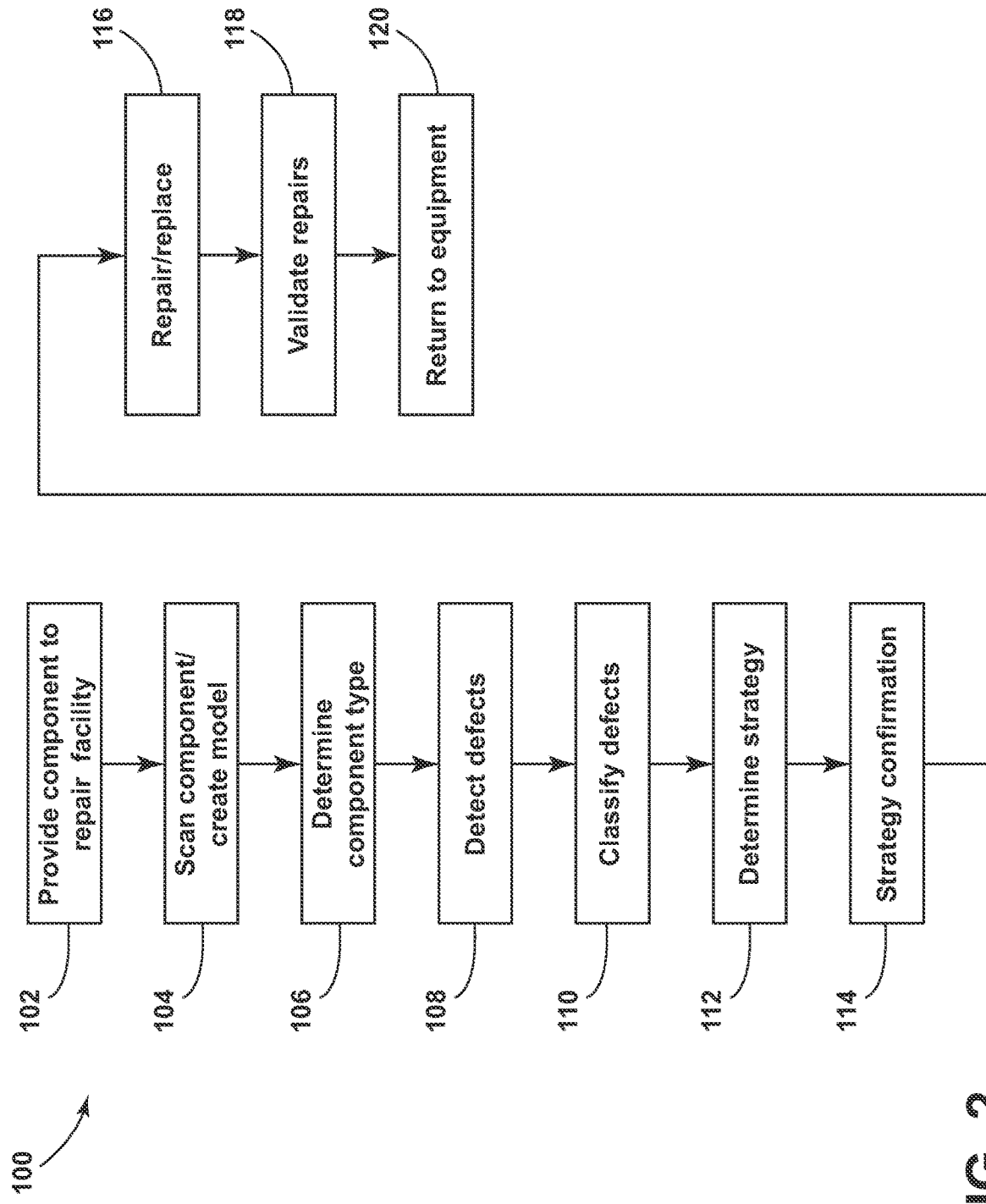
FIG. 2 is a flow chart generally illustrating an embodiment of a maintenance method according to teachings of the present disclosure.
Figure 3B:
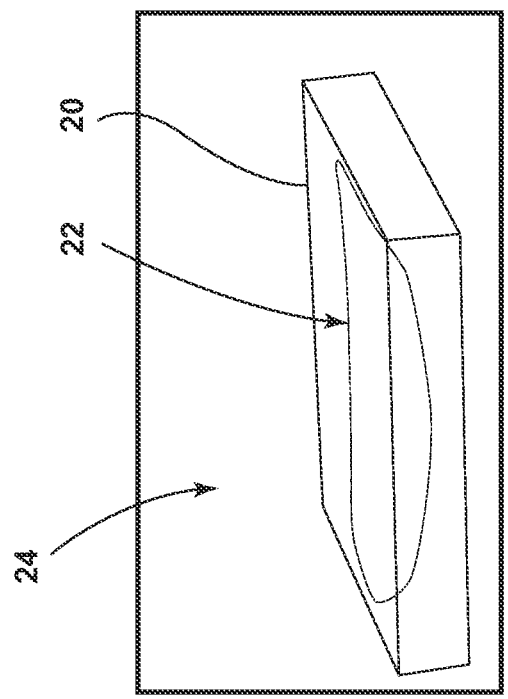
Figure 3A:
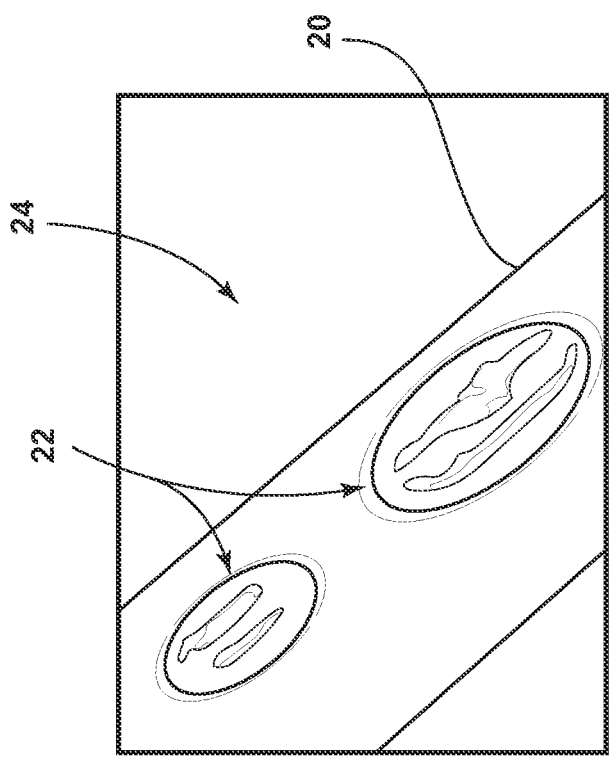

In embodiments, such as generally illustrated in FIG. 2, a method 100 of conducting maintenance for a component 20 of equipment 12 (e.g., machine, vehicle, etc.) may include providing a component 20 to a repair facility (step 102); scanning and/or generating a digital model 24 of the component 20 (step 104); determining a type of the component 20 (step 106); automatically detecting one or more defects, such as via analyzing the digital model 24 with the associated attributes to automatically detect defects 22 or damages of the component 20 and/or extracting defect features (see, e.g., example defects 22 generally illustrated in FIGS. 3A-3F) (step 108); classifying defects 22 into various categories (dent, scratch, nick, pit, etc.) (step 110); evaluating the defects 22 against criteria to determine a repair strategy, which may include whether to return to service, repair, or replace a component 20 (step 112); confirming the repair strategy (step 114); repairing and/or replacing the component 20 (step 116); validating the repaired component 20 (step 118); and/or returning the component 20 (or its replacement) to the equipment (step 120). One or more portions of the method 100 may be controlled and/or conducted partially or entirely via the ECU 32.

With embodiments, it may be determined that a component 20 of equipment 12 may have one or more defects 22 (e.g., dents, nicks, scratches, pits, etc.) that may need to be repaired and/or that a component 20 may need to be replaced, such as via poor performance of the component 20 and/or as revealed via a preliminary visual inspection. Additionally or alternatively, a component 20 may be evaluated for defects/damage 22 as part of a routine maintenance schedule/program. The component 20 may be removed from the equipment 12 and provided (e.g., moved, shipped, etc.) to a repair facility 30 (e.g., step 102).

With embodiments, generating a digital model 24 of a component 20 (e.g., step 104) may include acquiring three-dimensional mapping of the component 20, such as via point cloud data. The ECU 32 may, for example, map the point cloud data to multiple planar representations using gradient-based transformations. A noncontact-based method may be used to extract a point cloud and/or image data of the component 20. A noncontact-based method may, for example, include utilizing a scanning system that may include laser or optical scanners 36 that may be utilized to obtain data (e.g. geometric data) of the component 20. Additionally or alternatively, a contact-based method may be utilized to identify, define, and/or extract certain features of the component 20 (block 132) (e.g., primitives). For example and without limitation, a component 20 may include a duct and/or primitives that may be identified via a contact-based method may include cylindrical, bend, and/or conical features. The primitives may facilitate extraction of the component attributes and thereby aid to generate the digital model 24. A contact-based method may, for example and without limitation, utilize a coordinate measuring machine (CMM).

In embodiments, determining a type of a component 20 (e.g., step 106) may include determining if the component 20 is a first type (e.g., a known component) or a second type (e.g., an unknown component). Determining if a component 20 is known or unknown may include comparing the digital model 24 (e.g., various attributes, such as geometry, straight, bend, conical, variable sections, outer diameter, thickness, bend radius, material, insulation, etc.) of the component 20 to be repaired with existing models of other components, if any. Information about existing models may be stored in a digital library and/or product lifecycle management system (PLM) that may be connected to and/or incorporated with the ECU 32. If the component to be repaired 20 is sufficiently similar to an existing model (e.g., attributes are within predetermined thresholds), the component 20 may be identified as a first type of component 20 and/or the existing model may be associated with the component to be repaired 20 (e.g., as a baseline for comparison). For example and without limitation, a component 20 may be considered a first type of component 20 if the design and/or repair methods are well understood and/or readily available (e.g., if a component 20 with a substantially similar configuration has been repaired previously).

With embodiments, if the component to be repaired 20 is not sufficiently similar to an existing model (e.g., attributes are not within predetermined thresholds), the component 20 may be identified as a second type of component 20. If the component 20 is identified as a second type of component, the ECU 32 may associate an existing model that is most similar to the component to be repaired 20 with the component to be repaired 20 (e.g., even if not within thresholds).

Figure 4:
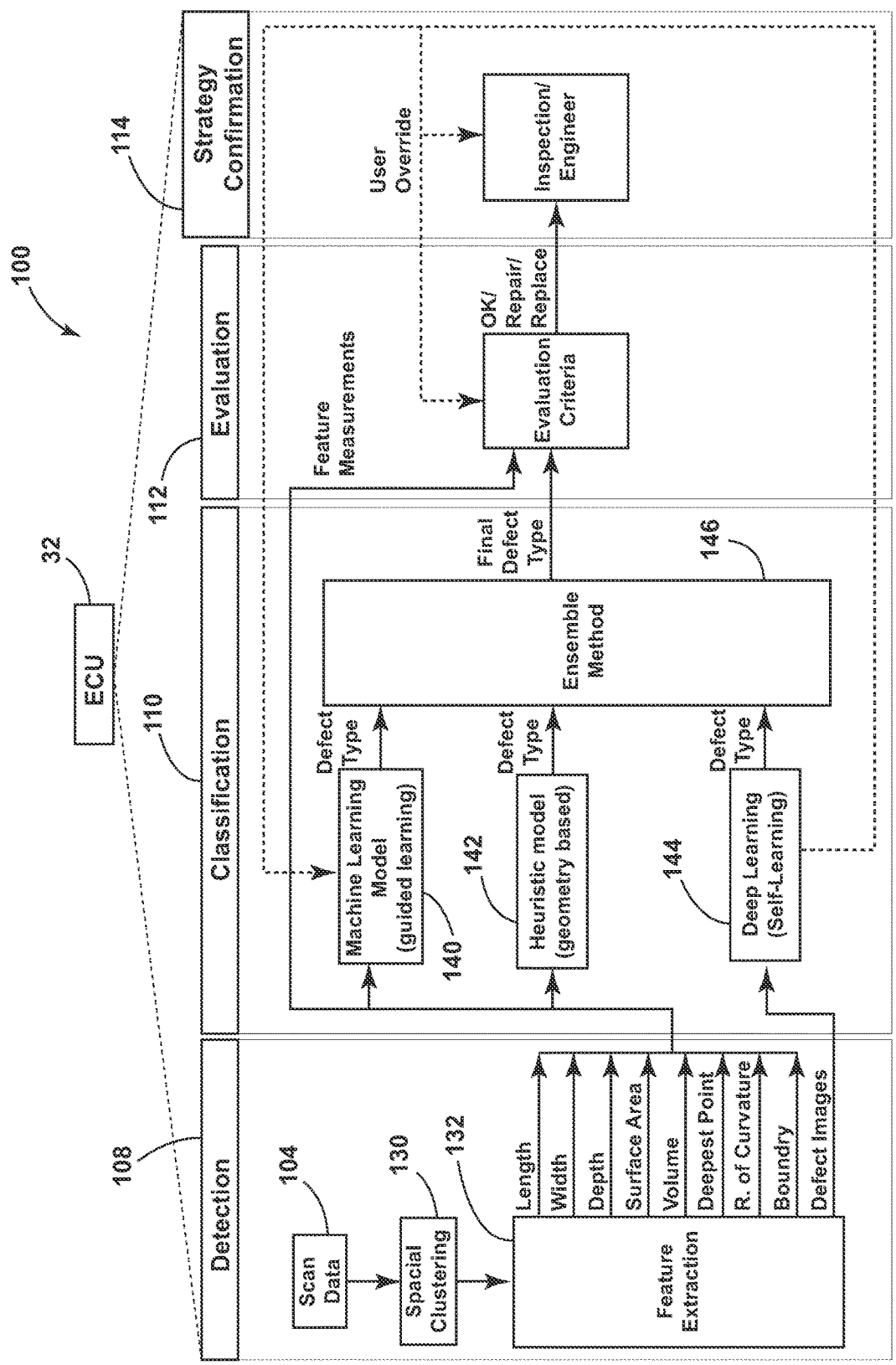
FIG. 4 is a flow chart generally illustrating an embodiment of a maintenance method according to teachings of the present disclosure.

With embodiments, such as generally illustrated in FIG. 4, an ECU 32 may be configured to detect defects and/or damage 22 of a component 20. Detecting a defect 22 may include analyzing a digital model 24 of the component to be repaired 20. The digital model 24 may include feature information/data. Detecting a defect 22 may include the ECU 32 isolating regions of the component 20 that may be of interest (e.g., potential defects/damaged regions 22, etc.) and/or applying machine learning (e.g., ensemble learning) to the digital model 24 and/or the information/data thereof. For example and without limitation, the ECU 32 may compare the digital model 24 to one or more other models, such as models of other components and/or of similar components, and may detect a defect 22 if a difference between the one or more other models and the digital model 24 is above a threshold.

In embodiments, the ECU 32 may detect defects 22 via statistical and/or data mining methods, and/or may be configured to extract/measure defect features (e.g., block 132), such as via geometrical methods. If a reference model of a component 20 is not available, the ECU 32 may apply statistical methods to detect defects 22 relative to surface levels of the component 20. The ECU 32 may be configured to spatially cluster digital model information (block 130) and/or may be configured to apply data mining to facilitate segmenting of defects 22 spatially. The ECU 32 may utilize geometrical methods to measure various attributes of a defect 22, such as, for example, length, width, depth, volume, surface area, bounding box vector, boundary points, deepest point, and/or radius of curvature information, among other defect feature information.

With some embodiments, if information about other components or defects is not available, a user may identify a defect or damage 22 of a component 20 (e.g., via visual inspection, reverse engineering, etc.), and the ECU 32 may store information about identified defect/damage 22. Such stored information may be used by the ECU 32 for detecting other defects 22 in the component 20 and/or defects in other components. For example and without limitation, if the ECU 32 has at least some information about at least one component 20 and a defect or damage 22 of that component 20, the ECU 32 may automatically detect defects/damage 22 in other components (which may be different than the initial component 20), such as without user input and/or with reduced user input.

In embodiments, an ECU 32 may classify defects 22 into various defect categories (e.g., step 110), such as according, at least in part, to the defect information obtained via defect detection (e.g., in step 108). Defect categories may, for example, include splits, kinks, cracks, dents, nicks, scratches, and/or scores, among others. Defect classification may be accomplished utilizing one or more ensemble methods 146 that may be implemented via the ECU 32. Ensemble methods 146 may include machine learning methods 140, heuristics methods 142, and/or deep learning methods 144. With heuristics 142, the ECU 32 may evaluate geometrical features of the defect 22 against one or more thresholds and/or apply predefined logic that may be derived from prior knowledge (e.g., defects 22 of other components/models) to identify a defect type. With machine learning 140, the ECU 32 may utilize defect attributes to train models 24, such as via manual corrections to heurist model output. For deep learning 144, the ECU 32 may apply image and/or pattern recognition techniques, such in the form of a neural network topology that may utilize multiple layers to break down the image into abstract pieces. The ECU 32 may utilize assigned weights of biases of the abstract pieces to determine/predict a defect type. An ensemble methods approach 146 may utilize information from machine learning 140, heuristics 142, and/or deep learning 144 to generate an optimized model 24 of the defect(s) 22 and/or determine a final defect type. For example and without limitation, an ensemble method 146 may select the most common defect type (e.g., a type identified by at least two of machine learning 140, heuristics 142, and deep learning 144) as the final defect type.

In embodiments, once an ECU 32 identifies a defect type of a defect 22, the ECU 32 may label the defect 22 in the digital model 24 accordingly (see, e.g., FIG. 3E).

With embodiments, an ECU 32 may be configured to evaluate classified defects 22, such as to determine a repair strategy (e.g., step 112). For example, the ECU 32 may compare the type/category of defect 22 with certain criteria (e.g., inspection manual guidelines, requirements, rules, etc.) such as using heuristic models. The ECU 32 may determine whether to return to service, repair, or replace the section of the component 20 having the defect 22. The ECU 32 may determine to return to service (e.g., without repair or replacement) a section of a component 20 having a defect 22 if the features of the defect 22 meet certain criteria (e.g., the defect 22 is not expected to materially impair use of the component 20). The ECU 32 may determine to repair a defect 22 if the defect 22 does not meet the return to service criteria but is capable of being fixed and fixing the defect is efficient. The ECU 32 may determine to replace the section of the component 20 if the features of the component 20 do not meet the return to service criteria and the defect 22 is not capable of being fixed or fixing the defect is not efficient. Replacing a defective section may include removing (e.g., cutting out) the defective section and replacing the defective section with a new section. In some circumstances, such as if the ECU 32 determines that at least half of a component 20 should be replaced, the ECU 32 may determine that the entire component 20 should be replaced.

With embodiments, criteria for evaluating defects may correspond to serviceable limits, such as may be provided by a manufacturer of the equipment 12. The limits may vary based on the equipment 12, the application of the component 20 in the equipment 12 (e.g., the application of a duct in an engine), and/or by the damage or defect category.

In embodiments, based on the determination of whether to return to service, repair, or replace a defective section, the ECU 32 may determine a repair strategy (e.g., an optimal repair strategy). An optimal repair strategy may, for example, include which defect/damage 22 should be repaired using cold work tubing or blend, which set of defects or damages 22 should be removed by cutting out damaged sections and welding in new portions, and/or which set of sub-components should be replaced, among other actions that may maximize efficiency (e.g., economic, time, etc.).

In some embodiments, a maintenance method 100 may include a confirming a repair strategy and/or a defect type (step 114). For example and without limitation, a user may review the defect type and/or a repair strategy determined by the ECU 32 and confirm that the type and/or repair strategy is appropriate (e.g., addresses identified defects/damage 22, is cost efficient, etc.), such as prior to repairing the component 20. If the defect type and/or repair strategy are not appropriate or if the user has other reasons for doing so, the user may override the determined defect type and/or the repair strategy.

With some embodiments, after the ECU 32 determines a repair strategy, information corresponding to the repair strategy may be provided to an owner/user of the component 20 and/or equipment. The information may, for example, include a quotation for the cost of carrying out the repair strategy. If the owner/user approves, the repair strategy may be implemented. If the owner/user does not approve, the component 20 may be returned to the owner/user or the component 20 may be scrapped.

With embodiments, a maintenance method 100 may include repairing a defect 22 of a component 20 (e.g., step 116), such as according to a repair strategy determined by the ECU 32.

Figure 5:
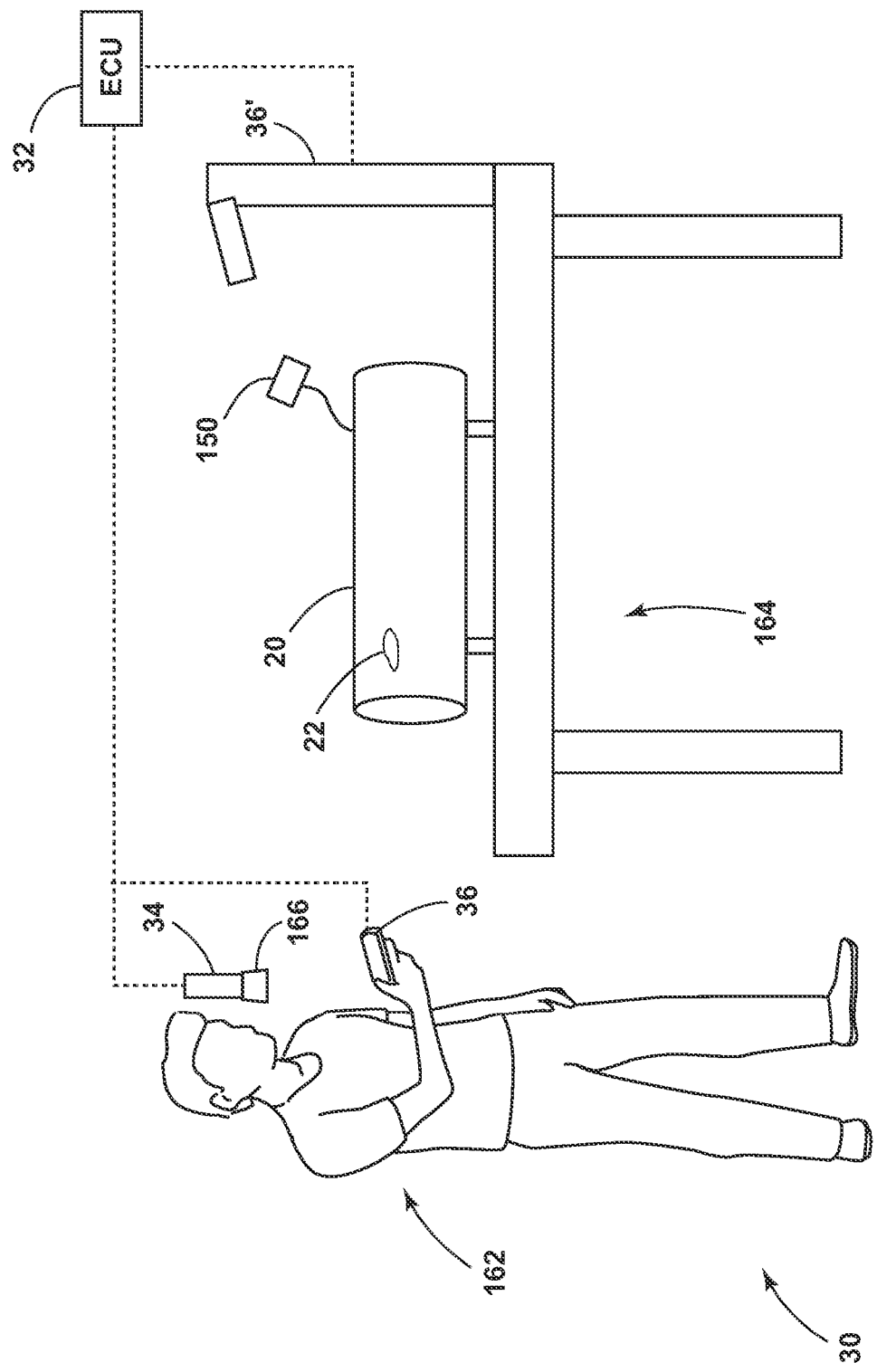
FIG. 5 is a side view generally illustrating an embodiment of a repair facility of a maintenance system according to teachings of the present disclosure.

With embodiments, such as generally illustrated in FIG. 5, a component 20 may be connected (e.g., mounted) with one or more fixtures 164 (e.g., jigs, tables, stands, etc.). Using the digital model 24 of the component 20 and the determined repairs, the ECU 32 may determine, such as via an optimization method, mounting locations and/or an appropriate set of fixtures 164 to be used from a fixture reference library that may be stored in a memory of or connected to the ECU 32. For example and without limitation, the ECU 32 may select one or more fixtures 164 that do not impair access to the portions of the component 20 that are being repaired. If existing fixtures are not sufficient, the ECU 32 may create a set of new/custom fixtures 164 that may be built to mount the component 20 for repair. The custom fixtures 164 may, for example and without limitation, be created using additive manufacturing (AM) technology. The ECU 32 may be configured to automatically build the custom fixture(s) 164 via an AM machine 40 that may be disposed in a repair facility 30 and/or connected to the ECU 32.

In embodiments, if a section of a component 20 is determined to be cut and replaced, the ECU 32 may automatically order a replacement section and/or may send a model 24 (e.g., a 3D model) of the section, which may be autogenerated, to an AM machine for fabrication/printing. The AM machine 40 may or may not be disposed in a repair facility 30.

With embodiments, after the completion of a repair operation on a component 20, the ECU 32 may validate the repaired component 20 (step 118), such as via creating a digital model of the repaired component 20. The ECU 32 may utilize a reduced order failure model to evaluate the repaired component 20, such as to determine a quality of the repair and/or whether the repaired component 20 is ready to be reassembled/reinstalled with equipment. If the ECU 32 determines that the repaired component 20 is ready to be reassembly/installed with equipment, the repaired component 20 may be tagged, such as with a tag 150 (e.g., a FAA 81320 tag) via a tagging machine 42, and/or may be reinstalled in the equipment 12 (step 120) (e.g., FIGS. 1 and 5).

In embodiments, such as generally illustrated in FIG. 5, a repair facility 30 may include an ECU 32, a fixture 164, one or more scanners 36, 36', a fixture 164, a display 32, and/or a component for repair 20.

Figure 6:
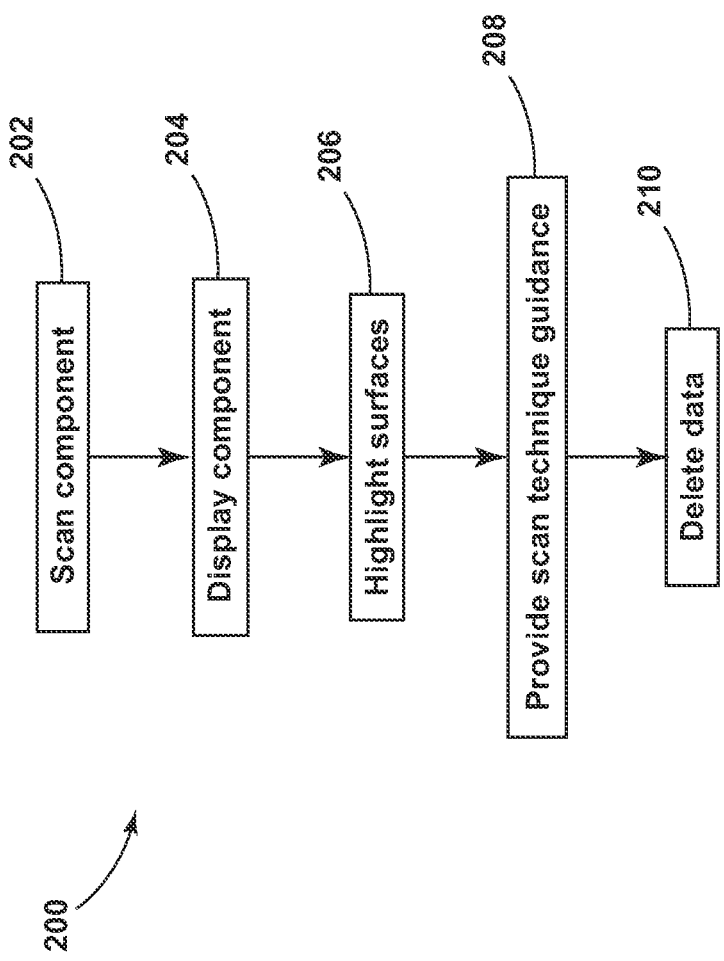
FIG. 6 is a flow chart generally illustrating an embodiment a method of generating a model of a component according to teachings of the present disclosure.

With embodiments, such as generally illustrated in FIG. 6, a method 200 of scanning a component 20 may be utilized for generating a model 24 of a component 20 (e.g., step 104 of method 100). The method 200 may include scanning the component 20 (step 202). Scanning the component 20 may include scanning the component 20 with one or more scanners (e.g., laser scanners), such as a handheld scanner 36 and/or a mounted scanner 36'. Scanning the component 20 may include obtaining one or more measurements of the component 20 that may be provided to an ECU 32, which may store the measurements.

In embodiments, a method 200 of scanning a component 20 may include displaying an image, representation, and/or model 24 of at least a portion of the component 20 (step 204), such as on a display 34 while a user 162 scans the component 20. The image/model 24 of the component 20 may be overlaid on the component 20 itself that may be visible via/through the display 34 (e.g., the display 34 may include an at least semitransparent portion). The display 34 may for example, include and/or be included with goggles and/or a headset, such as an augmented reality (AR) headset (see, e.g., FIG. 6). Displaying the component 20 via a headset (or other display device connected with a head of a user 162) may, for example, allow the user 162 to view information relating to the component 20, an image/model 24 of at least a portion of the component 20, and/or the component 20 itself simultaneously (e.g., without shifting vision between the component 20 and a separate display device).

Figure 7:
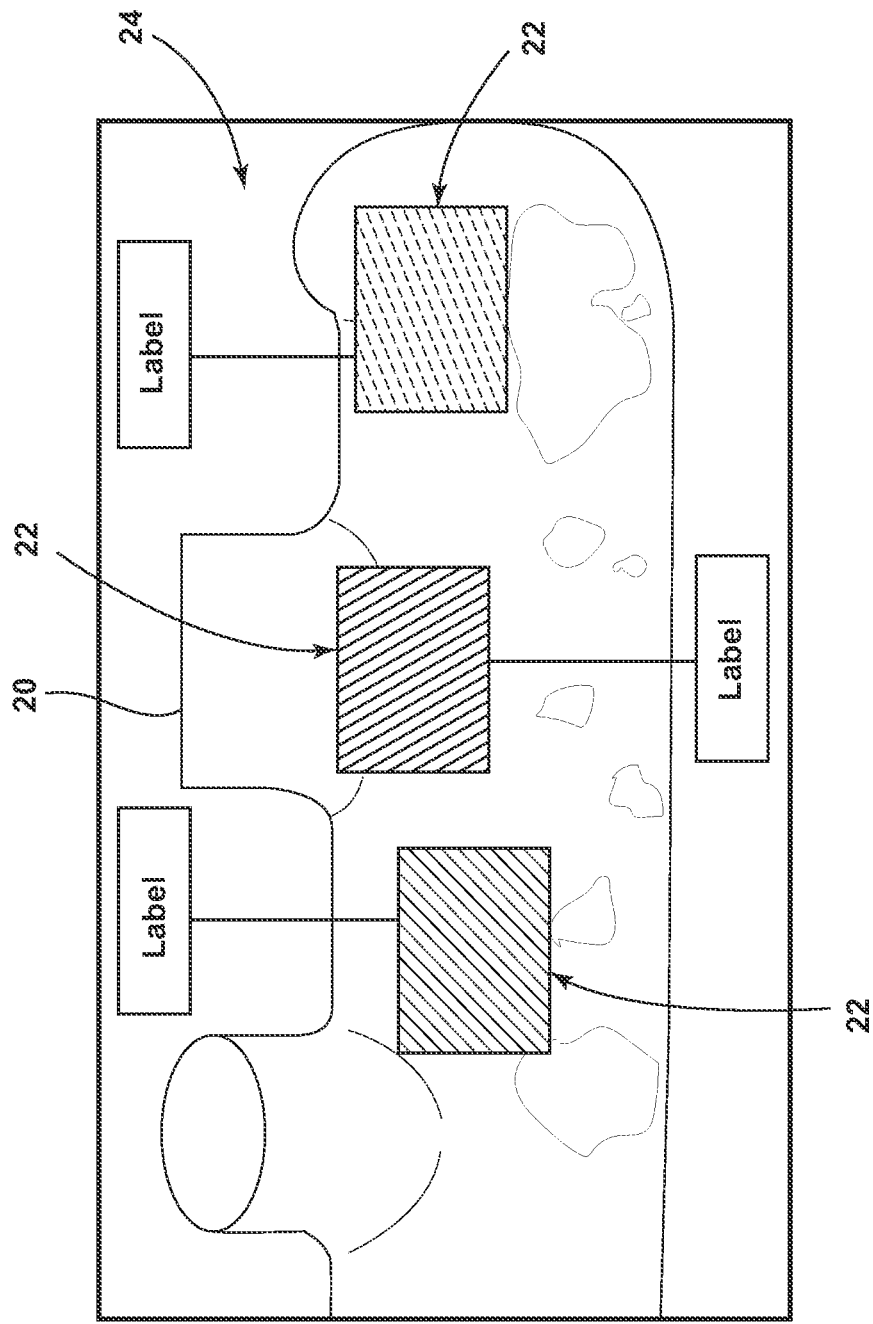
FIG. 7 is a representation of a component generally illustrated via an embodiment of a display of a maintenance system according to teachings of the present disclosure.

With embodiments, the method 200 may include highlighting, labeling or otherwise identifying surfaces of the component 20 (step 206). Highlighting/identifying surfaces of the component 20 may include the ECU 32 determining which portions of the component 20 have not been scanned/measured and highlighting/identifying those portions on the display 32 (see, e.g., FIG. 7). The user 162 may view the highlighted/identified portions and scan the highlighted portions. Additionally or alternatively, the ECU 32 may highlight/identify portions of a component 20 that have been scanned in a first color (e.g., green) and highlight portions that have not been scanned in a second color (e.g., red).

In embodiments, the ECU 32 may highlight portions of a component 20 in a plurality of colors to indicate the quality of the data obtained for the displayed portions of the component 20. For example and without limitation, the ECU 32 may highlight portions of the component 20 for which sufficient data has been obtained (e.g., via scanning) in a first color (e.g., green), may highlight portions for which no data has been obtained in a second color (e.g., red), and/or may highlight portions for which some data/insufficient data has been obtained in a third color (e.g., yellow/orange). Highlighting portions of a component 22 during scanning may facilitate efficient scanning.

In embodiments, the method 200 may include providing visual guidance to the user 162 (step 208), such as via the display 34. For example, the ECU 32 may provide a visual notification/alert to the user 162 (e.g., on the display 32, an audible notification, etc.) if the user 162 is attempting to scan a component 20 outside of recommended guidelines, such as misaligning a scanner 36, 36' relative to the component 20 and/or materially changing an orientation of a scanner 36, 36' during a scanning event (e.g., a scan pass), if there is a high normal angle, if there is low data density, and/or if there is a high level of noise in the obtained data, among others.

With embodiments, the method 200 may include deleting data obtained for a component 20 (step 210). For example and without limitation, the ECU 32 may be configured to receive user input that may identify obtained data that should be deleted, such as data that does not correspond to the component 20 (e.g., corresponds to a table/fixture 164 on which the component 20 is mounted). The ECU 32 may obtain the user input via one or more of a variety of methods. For example and without limitation, the ECU 32 may be connected to one or more cameras 166 that may be configured to sense and/or monitor the position of the hands of the user 162, such as relative to the component 20. In embodiments, the one or cameras 166 may be disposed proximate the component 20, may be connected to a table/fixture 164 supporting the component 20, and/or may be connected to a headset/display 34.

In embodiments, the ECU 32 may be configured to communicate with the display/headset 34 and/or the scanners 36, 36', a repair machine 38 (e.g., a duct bender, welder, etc.), an AM machine 40, and/or a tag machine 42 wirelessly and/or via wired connections.

Embodiments of a system 10 and/or methods 100, 200 may be more efficient that other designs. With other designs, a complete maintenance process may be very labor-intensive, and the turnaround time (TAT) for some components may be in the range of 33-56 days. About 70% of the TAT may be spent on engineering/supply chain management (SCM) evaluation and visual inspection (which may include reverse engineering, repair feasibility and techniques analysis, tooling requirements analysis, consumable and spares analysis, parts analysis, cost analysis, lead time analysis, tear down sheet creation, part availability analysis and verification, and/or tool requirement analysis and verification, among others), particularly for unknown components, and the remaining 30% may be spent on repair, testing, and certification. A large portion of repairs may be performed on unknown components whose design and repair knowhow may not be completely known or readily available. In contrast, embodiments of the system 10 and/or method 100, 200 may be configured to provide a TAT about 3-5 days, which may correspond to about a 95% improvement in TAT, at least in some circumstances, even for components 20 for which design and repair knowhow/information are not known or readily available. Additionally or alternatively, embodiments of the system 10/method 100, 200 may, for example and without limitation, reduce expenses, such as engineering expenses, and/or may increase efficiency, such as by about 400%, compared to other designs.

Efficiency improvements may be a result of, at least in part, replacing some or all portions of existing labor-intensive processes of visual inspection, evaluation, and/or repair with a set of digital methods that may be implemented automatically via an ECU 32, and/or vertically integrating one or more portions of a maintenance method 100 (e.g., automatically printing repair sections and/or mounting fixtures).

Embodiments of the system 10/method 100, 200 may automatically detect, classify, and/or evaluate damages/defects 22 without an exact reference model and/or prior repair information for the specific component 20 (e.g., may be component agnostic).

Embodiments of a system 10/method 100 may determine an optimal repair strategy and optimal fixture placements, and/or may transmit digital models of fixtures 164 and repair sections to additive manufacturing machines/printers 40.

In examples, an ECU (e.g., ECU 32) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A maintenance method for servicing a component, the method including:
   generating, via an electronic control unit, a digital model of the component;
   detecting, via the electronic control unit, a defect of the component;
   classifying, via the electronic control unit, the defect as a defect type;
   evaluating the defect to determine, according to the defect type, whether to repair the defect or to replace a section of the component containing the defect; and automatically designing or selecting a mounting fixture for the component during repair of the defect.

2. The method of claim 1, including repairing the defect and/or replacing the section of the component containing the defect with a new section.

3. The method of claim 2, including creating the new section via additive manufacturing.

4. The method of claim 1, including:
repairing the defect to provide a repaired component; and
validating the repaired component;
wherein validating the repaired component includes creating a digital model of the repaired component.

5. The method of claim 1, wherein classifying the defect includes applying ensemble learning to the digital model and/or data thereof.

6. The method of claim 5, wherein ensemble learning includes determining the defect type according to information from machine learning, heuristics, and deep learning applied to the digital model and/or the data thereof.

7. The method of claim 1, wherein generating the digital model of the component facilitates the detecting of the defect.

8. The method of claim 1, wherein generating the digital model includes scanning the component via a noncontact sensor.

9. The method of claim 8, wherein the noncontact sensor includes a handheld laser scanner.

10. The method of claim 1, wherein generating the digital model includes scanning the component via a noncontact sensor while displaying a least a portion of the component on an electronic display.

11. The method of claim 10, wherein the electronic display is configured as a headset and/or goggles.

12. The method of claim 11, wherein displaying at least the portion of the component on the electronic display includes displaying sections of the component in different colors according to a quality of data scanned.

13. The method of claim 1, including displaying the defect on an electronic display in a color corresponding to the defect type.

14. The method of claim 1, including:
automatically designing a mounting fixture for the component during repair of the defect; and
automatically creating the designed mounting fixture via additive manufacturing.

15. A maintenance system for servicing components, the system comprising:
an electronic control unit (ECU);
a scanner configured to obtain three-dimensional data of a component and connected to the ECU;
an additive manufacturing machine;
wherein the ECU is configured to:
create a digital model of the component according to the three-dimensional data;
detect a defect of the component from the digital model and/or the three-dimensional data;
classify the defect as a defect type of a plurality of defect types;
evaluate the defect according to the defect type; and
automatically create a replacement section for the component via the additive manufacturing machine.

16. The system of claim 15, including an electronic display connected to the ECU;
wherein the ECU is configured to at least partially display the component on the electronic display while a user scans the component via the scanner; and
the electronic display is configured for connection with said user.

17. The system of claim 16, wherein the electronic display is configured as a headset and/or goggles configured for connection with a head of said user.

18. The system of claim 16, wherein the ECU is configured to display sections of the component on the electronic display in different colors according to a quality of data obtained via the scanner to facilitate efficient scanning of the component.

19. The system of claim 16, wherein the ECU is configured to display the defect on the electronic display in a color corresponding to the defect type.

20. A maintenance method for servicing a component, the method including:
generating, via an electronic control unit, a digital model of the component;
detecting, via the electronic control unit, a defect of the component;
classifying, via the electronic control unit, the defect as a defect type; and
evaluating the defect to determine, according to the defect type, whether to repair the defect or to replace a section of the component containing the defect; and
displaying at least the portion of the component on an electronic display with one or more sections of the component in different colors according to a quality of data scanned.

21. A maintenance system for servicing components, the system comprising:
an electronic control unit (ECU);
a scanner configured to obtain three-dimensional data of a component and connected to the ECU;
an electronic display;
wherein the ECU is configured to:
create a digital model of the component according to the three-dimensional data;
detect a defect of the component from the digital model and/or the three-dimensional data;
classify the defect as a defect type of a plurality of defect types;
evaluate the defect according to the defect type; and
display sections of the component on the electronic display in different colors according to a quality of data obtained via the scanner to facilitate efficient scanning of the component.

* * * * *